United States Patent [19]

Müller

[11] Patent Number: 4,889,920
[45] Date of Patent: Dec. 26, 1989

[54] INSTANTIZED GELATIN SOLUBLE IN COLD WATER

[75] Inventor: Alexander Müller, Eberbach, Fed. Rep. of Germany

[73] Assignee: Deutsche Gelatinefabriken Stoess & Co. GmbH, Eberbach/Baden, Fed. Rep. of Germany

[21] Appl. No.: 229,462

[22] Filed: Aug. 8, 1988

[30] Foreign Application Priority Data

Aug. 13, 1987 [DE] Fed. Rep. of Germany ....... 3726963

[51] Int. Cl.$^4$ .......................... C09H 3/00; C09H 5/00
[52] U.S. Cl. ..................... 530/355; 426/576; 426/657; 426/658; 530/354
[58] Field of Search .......................... 426/576; 530/355

[56] References Cited

U.S. PATENT DOCUMENTS

| | | | |
|---|---|---|---|
| 2,803,548 | 8/1957 | Hagerty | 426/576 |
| 2,841,498 | 7/1958 | Cahn | 426/576 |
| 2,948,622 | 8/1960 | Cahn | 426/576 |
| 4,588,602 | 5/1986 | Brown et al. | 426/576 |

*Primary Examiner*—Howard E. Schain
*Assistant Examiner*—Choon P. Koh
*Attorney, Agent, or Firm*—Wegner & Bretschneider

[57] ABSTRACT

A cold water-soluble instantized gelatin having full gelation ability while containing no additives is obtained by spraying a pure gelatin solution without additives and having a water content of at least 35% at a temperature in excess of the gelation and solidification temperature on an excess of finely divided solid gelatin particles which contain less than 8% of water, and drying the particles thus obtained in a fluid bed to a water content of from 8 to 13%, whereupon a portion is removed from the process as final product and is further dried to a water content as required for optimum dissolution to occur in cold water, while the remainder first is more effectively dried to a water content below 8% and is then recycled into the process.

8 Claims, No Drawings

INSTANTIZED GELATIN SOLUBLE IN COLD WATER

The present invention relates to instantized gelatin soluble in cold water having full gelation ability which is produced by drying gelatin solutions.

Gelatin by nature is soluble only in hot water and it is convenient to allow it in advance to swell in cold water. Since some products intended to be gelled with gelatin are extremely temperature-sensitive and, since the steps of swelling in advance, heating and allowing to cool involve significant expenses, there has long been a demand for converting gelatin to an instantized form in which it is soluble in cold water. According to prior art, two basically different routes are available to prepare a cold water-soluble instantized gelatin.

The first route comprises drying gelatin in combination with additives. More specifically, sugar, organic acids and urea have proven to be suitable additives.

The second route comprises overdrying gelatin which contains no additives. While commercially available gelatin has a water content of from 8 to 12%, the overdried instantized gelatin has a water content of only about 4%.

The cold water-soluble gelatin containing additives has the inherent drawback that these additives are undesirable or even unacceptable for a number of intended uses.

The prior art instantized gelatin without additives has the drawback that its gelation ability is substantially lower than that of the starting material in its normal dried state. As a matter of fact, this overdried gelatin does not form any more a genuine gel, but just a pseudo-gel. A true dissolution no longer occurs.

Thus, the real need for an instantized gelatin soluble in cold water having full gelation ability while containing no additives continues to exist. Now it was surprisingly found that such a gelatin can be prepared by spraying a pure gelatin solution without additives and having a water content of at least 35% at a temperature in excess of the gelation and solidification temperature on an excess of finely divided solid gelatin particles which contain less than 8% of water, and drying the particles thus obtained in a fluid bed to a water content of from 8 to 13% then a portion is removed from the process as final product and is further dried to a water content as required for optimum dissolution to occur in cold water; the remainder is first more effectively dried to a water content below 8% and is then recycled into the process.

The above result was very surprising, since after years of efforts to develop such product the art had accepted the view that an instantized gelatin soluble in cold water either must contain additives or have lost a large part of its gelation ability. Furthermore, it was surprising that the described product would be formed under the conditions of the invention, since it was known in the art that temperature stress rapidly deteriorates the properties of the gelatin, namely with respect to the gelation ability, water solubility and color.

Thus, drying solutions of gelatin with or without additives is always effected at temperatures as low as possible and, hence, significantly below the gelation and solidification temperature. According to the invention the gelatin is mostly sprayed on the excess of finely divided solid gelatin particles at a temperature within the range of from 70° C. and 120° C. It has proven to be advantageous for use in the spraying step to take the gelatin solution immediately from the sterilization stage.

Previous attempts to convert such gelatin solutions into a solid gelatin by spray drying have continuously failed to be successful, because gelatin under the conditions of spray drying forms tacky filaments and, therefore, is unsuitable for spray drying. It has only now been determined that it is, in fact, feasible to convert sprayed hot gelatin solutions into solid gelatin by spraying them on an excess of finely divided solid gelatin particles which contain less than 8% of water. Apparently, the excess amount of finely divided solid gelatin particles is much more capable than the drying air in a spray drier of rapidly absorbing the excess of water from the gelatin solution and thereby to shorten the tacky state. Surprisingly, in the course of this process the per se overdried solid gelatin particles recover their initial gelation ability, so that the product obtainable according to the invention on the one hand, contrary to the overdried gelatin known so far, retains its full gelation ability while, on the other hand, it is present in a cold water soluble instantized form. In contrast to the instantized gelatin containing no additives known so far, the product according to the invention forms again a genuine gel.

Preferably, the process of the invention is carried out in such a manner that a gelatin solution having a water content of from 35 to 70%, and more preferably of from 45 to 55%, is directly taken from the sterilization stage and then sprayed on a fluid bed of charged product at a temperature between 70° C. and 120° C. The process is conducted so that first the average water content is adjusted to preferably 10 to 13% and then the product obtained is dried to a water content of 3.5 to 5% and is thereafter recyled in the process. In the course of the process, one part of the product the amount of which conforms to, the amount of dry matter in the introduced spray solution, is removed at a suitable location, so that the moisture content is optimal as pre-determined for such product. If desired, the drying procedure may be continued until an optimum water content for effecting an intended subsequent dissolution in water is obtained. It is readily possible to separate any oversize material if present and to recirculate it in a comminuted state. However, it is preferred to classify the final product and to return both the undersize and comminuted oversize materials into the process. According to the invention, it is possible to vary the particle size distribution and bulk density of the final product, whereas so far almost exclusively a bulk density of about 600 grams/liter was obtained. It is also possible to process collagen partial hydrolyzates in the place of gelatin according to the invention, which is of particular importance for a cold water soluble instantized glue or gelatin hydrolyzate.

Basically, all fluid bed driers are suitable for use in the process of the invention, so long as the solutions to be dried can be sprayed on the excess amount of finely divided solid gelatin particles already present. Particularly suitable are fluid bed spray granulators.

However, for the invention there may also be used belt driers comprising a suitable spraying device or vibration fluid bed driers. Alone of crucial importance is the fact that the transient tacky phase of the gelatin solution being dried is passed with sufficient mechanical motion of the particles so as to prevent irreversible agglutination as it occurs upon spraydrying. On the other hand, the process must be conducted so as to cause the sprayed gelatin solutions to hit the excess of finely divided solid gelatin particles at a temperature above the gelation and solidification temperature. Once the drying gelatin solutions will pass the gel phase, the resulting solid gelatin will lose its cold water solubility.

In the initial stage of first starting the process of the invention, as the excessive amount of finely divided solid gelatin particles there may also be used the previously known overdried instantized gelatin or a collagen hydrolyzate without additive. Thereby a first fraction is obtained which still contains portions of instantized gelatin or gelatin hydrolyzate having a reduced gelation ability. This fraction is preferably recycled into the process or to be used for some other purposes. As soon as a sufficient amount of cold water-soluble instantized gelatin of the invention will have been formed, this product may be used as the starting material by drying to a water content of from 3.5 to 5% and then spraying with the hot gelatin solution in the described manner.

The process according to the invention is preferably carried out in such a manner that, on the one hand, as little water as possible will have to be evaporated in the fluid bed, since this step comprises a relatively expensive and troublesome kind of removal of water; on the other hand, however, care should be taken that the viscosity of the gelatin solution is still as low as possible so that the solution may be readily sprayed and well distributed on the solid gelatin particles. Thus, temperatures of less than 70 ° C. will need a somewhat higher water content of the solution, thereby causing higher drying cost. Moreover, at temperatures below 70° C. the gelation and solidification temperature will be too closely approached. A temperature in excess of 140° C. results in too high a thermal stress for the gelatin. With the so-called short-time sterilization (140° C. for 6 seconds) there is obtained such a low-viscosity highly heated solution the water contents of which may even be reduced to 35%. However, such a gelatin solution then will have to be sprayed immediately. Since the conventional sterilization proceeds at about 115° C. for a period of 5 minutes, those solutions are best suitable to be subjected to spraying in the process according to the invention.

The cold water soluble instantized gelatin having full gelation ability which has been produced according to the invention can be used for any of the purposes for which so far instantized gelatin soluble in cold water has heretofore been used. Moreover, new fields of application offer themselves, at which so far either the additives or the low gelation ability have been found unacceptable and, thus, the more troublesome route of pre-swelling and hot water-dissolution was required.

The process according to the invention is further illustrated by the following Examples.

EXAMPLE 1

A 50% gelatin solution containing no additives is taken directly from the sterilization step at 115° C. and sprayed onto a fluid bed of about 80° C. which per unit of time conveys about the tenfold amount of finely divided solid gelatin. The water content of the finely divided solid gelatin particles is about 4%. About 10% of the amount of particles thus obtained are removed as final product and, upon cooling with cold air, have a water content of about 10%. The remainder of the sprayed particles is further dried to a water content of about 4% and then recycled into the spraying zone. The product obtained is soluble in cold water and has the full gelation ability of the initial gelatin.

EXAMPLE 2

The water content of the starting gelatin solution was varied between 45 and 55%. By variation of the drying conditions and the passage times it was possible to obtain from 7 to 15% of a final product having a water content of from 9 to 11%. In each case there was obtained a cold water-soluble instantized gelatin having full gelation ability, but containing no additives.

EXAMPLE 3

Under conditions comparable to those described in Example 1 the solution of a hot water soluble collagen-based glue was processed. A collagen-based cold water-soluble instantized glue was obtained.

EXAMPLE 4

Under conditions comparable to those described in Example 1 the solution of a gelatin hydrolyzate having a molecular weight of less than 15,000 was processed. A cold water soluble instantized gelatin hydrolyzate having a bulk density of more than 500 g/l was obtained.

I claim:

1. A process for producing an instantized gelatin soluble in cold water wherein
   a pure gelatin solution without additives and having a water content of at least 35% is sprayed at a temperature in excess of the gelation and solidification temperature on an excess of finely divided solid gelatin particles which contain less than 8% of water,
   the particles thus obtained are dried in a fluid bed to a water content of 8 to 13%,
   whereupon a portion is withdrawn from the process as final product and is further dried to a water content as required for optimum dissolution to occur in cold water,
   while the remainder is first more effectively dried to a water content below 8% and is then recycled into the process.

2. The process according to claim 1, wherein the gelatin solution has a water content of from 35 to 70% and is sprayed at a temperature of between 70° C. and 120° C.

3. The process according to claim 1, wherein the gelatin solution is directly taken from the sterilization stage and sprayed.

4. The process according to claim 1, wherein the particles are first dried to a water content of from 9 to 11% and upon withdrawal of from 7 to 15% of final product the remainder is continued to be dried to a water contents of from 3.5 to 5%.

5. The process according to claim 2, wherein the particles are first dried to a water content of from 9 to 11% and upon withdrawal of from 7 to 15% of final product the remainder is continued to be dried to a water contents of from 3.5 to 5%.

6. The process according to claim 1, wherein the final product is classified and both the undersize and comminuted oversize materials are returned into the process.

7. The process according to claim 2, wherein the final product is classified and both the undersize and comminuted oversize materials are returned into the process.

8. The process according to claim 5, wherein the final product is classified and both the undersize and comminuted oversize materials are returned into the process.

* * * * *